United States Patent [19]

Wuestner

[11] 4,315,584
[45] Feb. 16, 1982

[54] METHOD AND A DEVICE FOR SEPARATING A PLURALITY OF LIGHT WAVEGUIDES CARRIED IN A CABLE

[75] Inventor: Friedrich Wuestner, Wolfratshausen, Fed. Rep. of Germany

[73] Assignee: Siemens Aktiengesellschaft, Berlin & Munich, Fed. Rep. of Germany

[21] Appl. No.: 153,195

[22] Filed: May 27, 1980

[30] Foreign Application Priority Data

Jun. 21, 1979 [DE] Fed. Rep. of Germany ....... 2925070

[51] Int. Cl.³ .............................................. B26F 3/00
[52] U.S. Cl. ....................................... 225/2; 225/96.5
[58] Field of Search ...................... 65/2, 56, 105, 112, 65/174; 225/2, 96, 96.5

[56] References Cited

U.S. PATENT DOCUMENTS

| | | | |
|---|---|---|---|
| 3,909,226 | 9/1975 | McCourty et al. ................ | 65/112 X |
| 4,017,013 | 4/1977 | Hawk et al. ......................... | 225/96.5 |
| 4,039,309 | 8/1977 | Albanese et al. .......................... | 65/2 |
| 4,202,475 | 5/1980 | Hirai et al. ................................ | 225/2 |
| 4,216,004 | 8/1980 | Brehm et al. ........................... | 225/2 |
| 4,257,546 | 3/1981 | Benasutti ................................... | 225/2 |

OTHER PUBLICATIONS

The Bell System Technical Journal, Nov. 1973, "Optical Fiber End Preparation for Low-Loss Splices", pp. 1582–1584.

*Primary Examiner*—James G. Smith
*Attorney, Agent, or Firm*—Hill, Van Santen, Steadman, Chiara & Simpson

[57] ABSTRACT

A method and a device for cutting or breaking a plurality of light waveguides which are contained in a cable characterized by clamping each of the light waveguides at spaced points to hold a portion of the waveguides between said points parallel to each other, positioning the light waveguides extending between the points over an anvil with each of the light waveguides being parallel to one another, applying a common tension force to each of the waveguides at the other side of the anvil, applying a vertical force to each of the waveguides at a point on one side of the anvil to apply an axial prestress to each of the waveguides extending across the anvil, and notching each of the prestressed light waveguides at a point in contact with the anvil to cause separation of each of the waveguides at its notch.

11 Claims, 2 Drawing Figures

METHOD AND A DEVICE FOR SEPARATING A PLURALITY OF LIGHT WAVEGUIDES CARRIED IN A CABLE

BACKGROUND OF THE INVENTION

The present invention is directed to a method and a device for separating or cutting a plurality of light waveguides which are carried in a cable.

In producing cable connections, the ends of the individual light waveguides such as optical fibers must not only lie in a common plane but each end must also have an optical flat surface which is perpendicular to the longitudinal axis of the light waveguide. For producing a releasable plug-type connection, the ends of the light waveguides are then provided with an appropriate end piece. It is known in this context that one obtains a usable light waveguide end if the waveguide is first notched, then subsequently pulled to break the light waveguide at the notch location. However, a smooth, clean end surface, which is oriented perpendicular to the axis of the light waveguide, will only occur if a very specific pull is exerted on the light waveguide. When employing this method on a cable, which has a plurality of light waveguides, various difficulties will be encountered because the pull cannot be kept constant on each of the individual light waveguides without additional equipment.

SUMMARY OF THE INVENTION

The present invention is directed to providing a method which enables one to separate a plurality of light waveguides which are carried in the cable with a sufficient precision in one work step and to provide a device for accomplishing the method.

The inventive method comprises the steps of clamping or gripping each of the light waveguides at space points to hold a portion of the waveguides between the points parallel to each other, positioning the light waveguides extending between the points over an anvil with each of the light waveguides being parallel to one another, applying a common tensile force to each of the light waveguides at the other side of the anvil, applying a vertical force to each of the light waveguides to a point on one side of the anvil to apply an axial prestress to each of the waveguides extending across the anvil, notching each of the prestress light waveguides at a point in contact with the anvil to cause separation or breaking of each waveguide at its notch.

With the inventive method, on is in a position to maintain a precisely defined axial tensile stress on each individual light waveguide during the notching operation. By so doing, very clean and precise end surfaces will occur without any additional follow up processing.

A particular advantageous device for implementing the method is a device comprising an anvil positioned between a pair of common clamps for holding the waveguides in parallel to each other, at least one of said clamps being moveable and the other clamp preferably being stationary, means for applying a force on the moveable clamp to provide an axial tensile force, means for applying a vertical force to each of the waveguides positioned on the anvil at a point on the side of the anvil opposite the moveable clamp, and means positioned at the anvil for notching the waveguides for separating the waveguides at the notches. Preferably, the means for notching moves perpendicular to the light waveguides so that it will successively notch each of the waveguides.

Preferably, the device includes a chucking or guiding device having at least one waveguide engaging pressure pin or setbolt for each of the waveguides, means for loading each of the pressure pins so that a precise axial tensile stress can be applied to each waveguide to enable a clean cut surface to be obtained. If the individual light waveguides are successively notched with the assistance of a notching device moveable perpendicular to the light waveguides, the individual end surfaces lie in a common connection plane which is a desired condition for a good common, low-attenuation connection in all connection techniques.

In order to lend the individual light waveguides a definite prestress in common, the moveable clamp is rotatably mounted and is connected by a lever system to a forced measuring unit and torque generator. In order to achieve a cutting plane which extends precisely perpendicular to the axis of the waveguide, the anvil has a cylindrical surface with grooves which are parallel to a plane that is perpendicular to the axis of the cylindrical surface, to guide the individual light waveguides.

A simple common definite adjustment of the axial tensile stress is achieved according to the invention in that the individual pressure pins can be loaded by weights acting on levers. A great range of adjustment is achieved if the weights can be moved on the levers in a manner of a decimal balance.

Preferably, the notching device consists of a lever being pivotably mounted between its end on a slide which is moveable perpendicular to the axis of the light waveguides. One end of the lever has a wedge-shaped diamond notching tool or cutter and the other end is biased by an adjustable spring which will thus urge the diamond notching tool towards the waveguides with a prescribable pressure. Preferably the lever arm will carry a tracing pin, which will cooperate with a stationary template so that the cutter will move under a specific path. Preferably the template is designed in such a manner that the wedge-shaped diamond notching tool will execute a sinusoidal motion when it is moved over the waveguides resting on the anvil. By so doing, one is in the position to execute a cut which is precisely defined with reference to the radius of the individual waveguide.

DESCRIPTION OF THE PREFERRED EMBODIMENTS

Figure 1:
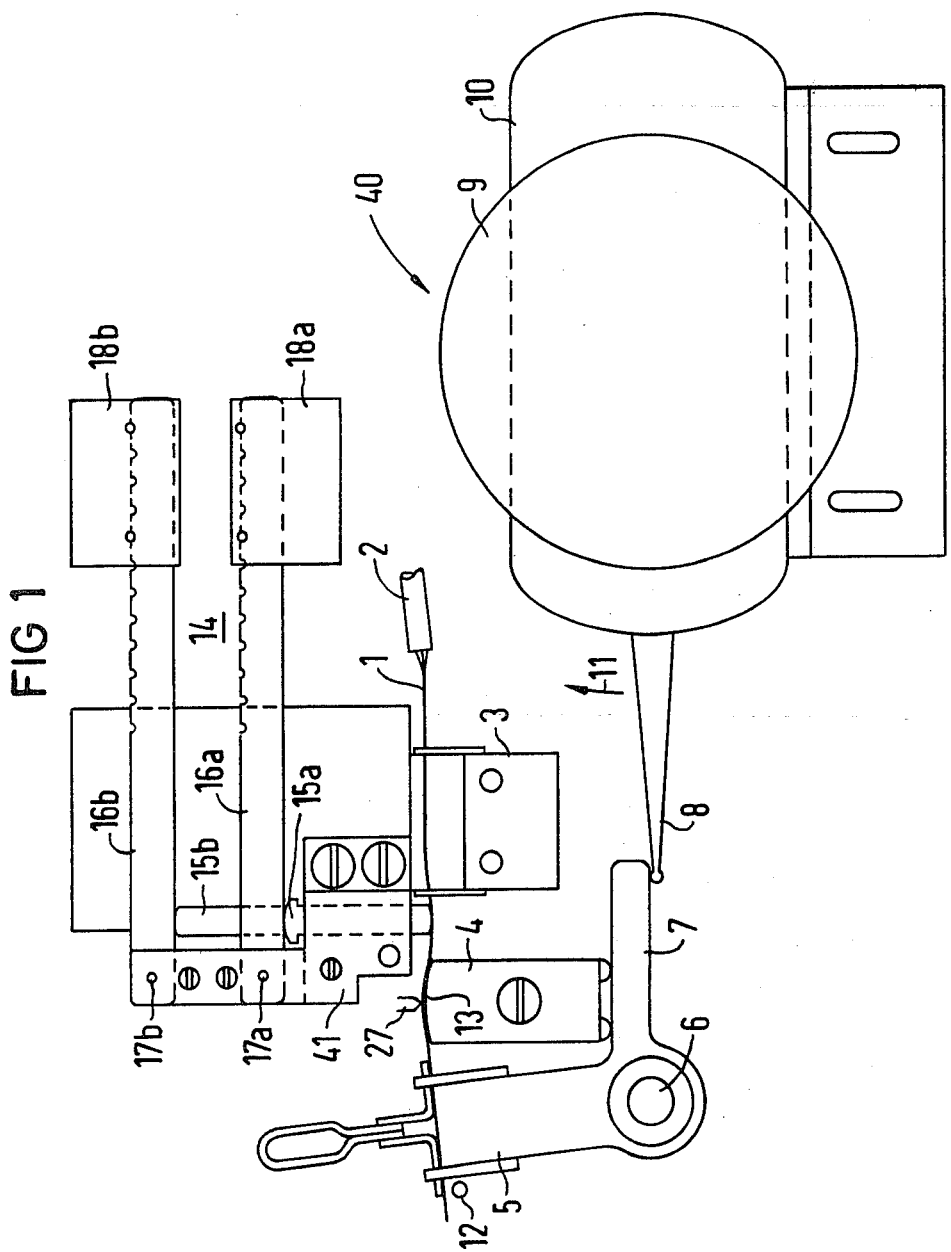
FIG. 1 is a side view with some parts removed to schematically illustrate the device of the present invention.
Figure 2:
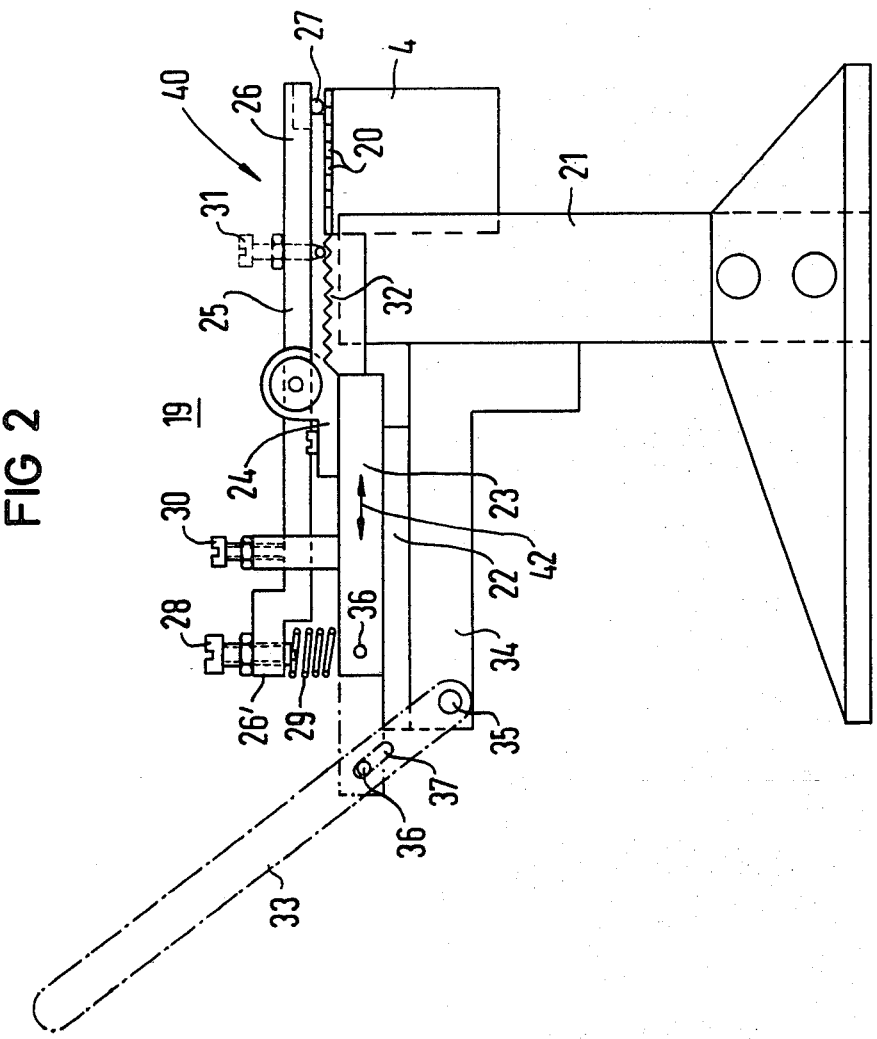
FIG. 2 is an end view with parts removed to schematically illustrate the notching device.

The principles of the present invention are particularly useful in a device generally indicated at 40 in FIGS. 1 and 2 for separating or breaking a plurality of waveguides 1 which are contained in a waveguide cable 2.

As in prefabrication of circuit and plug cables, the individual light guides, which may be optical fibers at the end of the cable 2 among other things must be untwisted, recognized and brought into the desired position in order to be able to be connected to corresponding light waveguides of another cable or the like. Usually, the cable ends are provided with so called end pieces in which the individual light waveguides or optical fibers assume a precise position. What is essential thereby, however, is that the individual light waveguides or fibers lie parallel to one another at a prescribed interval.

As best illustrated in FIG. 1, the device 40 includes a stationary clamping or gripping device 3, whose assistance enables the individual light waveguides 1 to lie in one plane, which extends perpendicular to the plane of the figure and with each of the waveguides being in a precise position to one another so that they extend parallel to each other. In order to guide the light waveguides 1 to be parallel, the clamping or gripping device 3 is preferably provided with parallel grooves which are preferably triangular grooves in which the light waveguides or optical fibers 1 are clamped. The clamping device can be part of a positioning device for example a positioning comb. The free ends of the light waveguides 1 are then conducted over an anvil 4 and are clamped in a moveable clamping device 5. The clamping device 5 for the light waveguide is designed similar to the clamping device 3 and is mainly provided so that the individual light waveguides lie parallel to one another. The moveable clamping device 5 is mounted for rotation on an axle 6 and is connected by an arm 7 to a lever 8 of a forced measuring unit or dynamometer 9 which contains a torque generator 10. The torque generator will rotate the lever 8 in the direction of arrow 11 to cause the clamping device 5 to execute a counter-clockwise motion. Thus, the clamped waveguides can each be subjected to a definite prestress, which can be set on the basis of the force measuring unit or dynamometer. A stop 12 is provided so that the rotational motion of the moveable clamping device 5 can be limited.

The anvil 4 has a cylindrical surface 13 into which a plurality of rectangular grooves 20 (FIG. 2) are provided to extend in the same direction as the light waveguides 1. As each of the grooves 20 extends across the anvil 4.

The device 40 includes means for applying a vertical pressure or force on each of the light waveguides 1 and as illustrated includes a chucking or guiding device 4 which has a member 41 that slideably supports pressure pins or setbolts 15a and 15b for each of the waveguides 1 and means for loading a vertical weight on each of the pressure pins so that the pressure pins will apply the vertical pressure to the light waveguides 1. This vertical pressure on each of the waveguides 1 will cause an axial tensile stress in the individual light waveguides. For setting a specific axial tensile stress, the means for loading includes a lever for each pressure pin so that pin 15a is provided with a lever 16a and pin 15b is provided with a lever 16b. The levers 16a and 16b are hinged on the member 41 of the guiding device 14 by pins 17a and 17b respectively. Each of the levers receives a weight with lever 16a receiving a weight 18a and the lever 16b receiving a weight 18b. As illustrated, the weights can be adjustably positioned along each of the respective levers which are provided with notches to enable positioning of the weights in precise positions. Thus the load on the pins 15a and 15b can be adjusted.

The device 40 includes the notching means or device generally indicated at 19 in FIG. 2, which only illustrates the anvil 4 having the rectangular grooves 20 for receiving the individual light waveguides which are extending parallel to each other. The notching device 19 includes a main frame 21, which has an extension 34 which receives a guidance member or part 22. A displaceable part 23 moves on the guidance part in a direction of the double arrow 42 which direction is perpendicular to the parallel waveguides in the grooves 20. The displaceable part 23 carries a pillow block 24 which supports a lever arm 25 at a position between its ends 26 and 26'. The one end 26 of the lever arm 25 carries a wedge-shaped diamond cutter 27 which forms a notching tool. The other end 26' of the lever 25 is provided with a spring 29, whose pressure is adjusted by a screw 28 and will attempt to rotate the arm 25 in a clockwise direction around the pivotable mounting in the pillow block 24. This rotary motion can be limited with the assistance of a stop screw 30. The lever 25 is also provided with a tracing pin 31, which is positioned to cooperate with a stationary template 32 that is mounted on the frame 21. The template 32 has successive teeth-like portions, whose number and spacing correspond to the spacing of the groove 20 in the anvil 4.

To shift the member 23 in the direction of a double arrow 42, a lever arm 33 shown in chain lines is pivotably mounted at 35 on the extension 34 and has a slot 37 receiving a pin 36 connected to the part 23. Thus, by rotating the lever 33 in a counterclockwise direction, the member or part 23 will move from the position illustrated in bold lines to a second position illustrated in chain lines. When moved to the position illustrated in chain lines, the wedge-shaped diamond cutter 27 will execute an approximately sinusoidal motion when moving over the light waveguides due to the interaction of the tracing pin 31 and the template 32. Thus with a knife-like motion the diamond cutter notches each individual light waveguide which is under a tensile stress. The separation occurs directly after the notching.

The inventive method now proceeds in such a manner that the light waveguides are clamped with the assistance of the clamping device 3 and 5 to extend over the anvil 4 and to be prestressed by a vertical pressure of a predetermined definite magnitude, which is exerted by the assistance of the pressure pins such as 15a and 15b on each of the individual waveguides. Under certain conditions, the clamping device 5 can be rotated clockwise. Thus, each of the light waveguides will have a precise tensile stress due to the pressure applied by the pressure pins. Subsequently, the wedge-shaped diamond cutter or notching tool 27 is guided over the individual light waveguides with the assistance of the lever 33 and as illustrated this path is precisely over the center of the anvil 4 (see FIG. 1). Thus, the individual light waveguides are successively notched. When all of the light waveguides are notched, then the rotatable clamping device 5 is moved against the stop 12.

The prestress of the individual light waveguides, which can be set with the assistance of the forced measuring unit 9 and is determined by the force applied to the rotatably clamping device 5, will depend on the number and strength of the individual light waveguides 1. Due to the coaction of the tracing pin 31 and the template 32 of the lever 25, the wedge-shaped diamond notching tool cannot be damaged in case a light waveguide is not present in one of the grooves. With the assistance of the inventive device, either a small number or a great number of light waveguides can be separated as necessary. Of course, it is also possible to separate only a single light waveguide utilizing the device. It is only essential in the inventive device that the precisely defined tensile stress can be predetermined with the assistance of the guiding device 14 for each individual light waveguides so that the separation of the light waveguides can always proceed under constant conditions.

Although various minor modifications may be suggested by those versed in the art, it should be understood that I wish to embody within the scope of the patent granted hereon, all such modifications as reasonably and properly come within the scope of my contribution to the art.

I claim:

1. A method for separating each light waveguide of a plurality of light waveguides which are in a cable of light waveguides comprising the steps of clamping each of the light waveguides at spaced points to hold a portion of the waveguides between said points parallel to each other, positioning the light waveguides extending between the points over an anvil with each of the light waveguides being parallel to one another, applying a common tension force to each of the waveguides at the other side of the anvil, applying a vertical force to each of the waveguides at a point on one side of the anvil to apply an axial prestress to each of the waveguides extending across the anvil, and notching each of the prestressed light waveguides at a point in contact with the anvil to cause separation of each of the waveguides at its notch.

2. A device for separating each light waveguide of a plurality of light waveguides which are contained in a cable, said device comprising an anvil positioned between a pair of common clamps for holding the waveguides in parallel to each other, at least one of said clamps being moveable, means for applying a force on the moveable clamp to provide an axial tensile force, means for applying a vertical force to each of the waveguides positioned on the anvil at a point on the side of the anvil opposite the moveable clamp, and means positioned at the anvil for notching the waveguides on the anvil for separating the waveguides at the notches.

3. A device according to claim 1, wherein the means for applying a vertical force includes a guiding device having at least one waveguide engaging pressure pins for each of the waveguides and means for loading each of the pressure pins to apply the vertical pressure on the waveguide, and wherein the means for notching comprises a notching device mounted for movement perpendicular to the light waveguides so that each of the light waveguides is notched in succession.

4. A device according to claim 3, wherein the moveable clamp is mounted to rotate about an axis offset from the plane of the parallel waveguides, said moveable clamp being connected to by a lever system to a torque generator and a force measuring unit enabling an application of a prescribed axial prestress by movement of said clamp.

5. A device according to claim 3, wherein the anvil has a cylindrical surface, said surface having parallel extending grooves with one groove for each of the individual light waveguides.

6. A device according to claim 5, wherein each of the grooves in the anvil have a rectangular profile.

7. A device according to claim 3, wherein the means for loading each of the individual pressure pins of the guiding device includes a lever, and weights disposed on said lever.

8. A device according to claim 7, wherein the weights are adjustable on the lever so that the amount of weight applied to each pressure pin can be adjusted.

9. A device according to claim 3, wherein the means for notching includes a lever arm being pivotably mounted between its ends on a slide moveable in a direction perpendicular to the axis of the waveguides, a wedge-shaped diamond cutter mounted at one end of said lever and a spring acting on the opposite end to urge the diamond cutter towards the anvil.

10. A device according to claim 8, wherein the lever arm is provided with a tracing pin coacting with a stationary template mounted adjacent the anvil so that the wedge-shaped diamond cutter moves in a predetermined path as the slide moves perpendicular to the waveguides.

11. A device according to claim 9, wherein the template is provided with a configuration so that the wedge-shaped diamond cutter executes approximately a sinusoidal motion when guided over the waveguides supported on the anvil.

* * * * *